(12) United States Patent
Mu et al.

(10) Patent No.: US 10,893,507 B2
(45) Date of Patent: Jan. 12, 2021

(54) METHOD FOR NOTIFYING AND DETERMINING REPETITIVE PATTERN OF UPLINK DATA, USER EQUIPMENT, AND BASE STATION

(71) Applicant: NTT DOCOMO, INC., Tokyo (JP)

(72) Inventors: Qin Mu, Beijing (CN); Liu Liu, Beijing (CN); Xiaohang Chen, Beijing (CN); Anxin Li, Beijing (CN); Huiling Jiang, Beijing (CN); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/326,350

(22) PCT Filed: Aug. 17, 2017

(86) PCT No.: PCT/CN2017/097837
§ 371 (c)(1),
(2) Date: Feb. 18, 2019

(87) PCT Pub. No.: WO2018/033112
PCT Pub. Date: Feb. 22, 2018

(65) Prior Publication Data
US 2019/0230630 A1 Jul. 25, 2019

(30) Foreign Application Priority Data

Aug. 19, 2016 (CN) .......................... 2016 1 0697464

(51) Int. Cl.
*H04W 4/00* (2018.01)
*H04W 72/02* (2009.01)
(Continued)

(52) U.S. Cl.
CPC .......... *H04W 72/02* (2013.01); *H04L 1/0003* (2013.01); *H04L 1/18* (2013.01); *H04L 1/1819* (2013.01);
(Continued)

(58) Field of Classification Search
None
See application file for complete search history.

(56) References Cited

U.S. PATENT DOCUMENTS 9,866,247 B2 * 1/2018 Wong .................... H04L 5/0044
10,439,764 B2 * 10/2019 Li .......................... H04L 1/0072
(Continued)

FOREIGN PATENT DOCUMENTS

| CN | 101197643 A | 6/2008 |
| CN | 105451164 A | 3/2016 |

(Continued)

OTHER PUBLICATIONS

International Search Report regarding PCT/CN2017/097837, dated Oct. 25, 2017.
(Continued)

*Primary Examiner* — Phuongchau Ba Nguyen
(74) *Attorney, Agent, or Firm* — Osha Bergman Watanabe & Burton LLP (57) ABSTRACT

A method for notifying a repetition pattern of uplink data, a method for determining a repetition pattern of uplink data, and a corresponding user equipment (UE) and base station are provided, wherein the base station is notified of a repetition pattern selected by the UE, so that the base station can correctly determine a transmitting timing of feedback information, thereby preventing a problem in which a transmitting timing of expected feedback information of the UE is inconsistent with the transmitting timing of the feedback information determined by the base station.

12 Claims, 4 Drawing Sheets

(51) Int. Cl.
    *H04L 1/18*     (2006.01)
    *H04L 1/00*     (2006.01)
    *H04W 72/04*     (2009.01)
    *H04W 88/02*     (2009.01)

(52) U.S. Cl.
    CPC ....... *H04L 1/1825* (2013.01); *H04W 72/0466* (2013.01); *H04W 88/02* (2013.01)

(56) References Cited

U.S. PATENT DOCUMENTS

| | | | |
|---|---|---|---|
| 10,574,406 B2* | 2/2020 | Wang | H04L 1/1896 |
| 2009/0060004 A1* | 3/2009 | Papasakellariou | H04W 72/0446 375/140 |
| 2015/0131564 A1* | 5/2015 | Seo | H04L 5/0055 370/329 |
| 2015/0139139 A1* | 5/2015 | Park | H04L 1/1861 370/329 |
| 2018/0007709 A1* | 1/2018 | Seo | H04L 1/00 |

FOREIGN PATENT DOCUMENTS

| | | |
|---|---|---|
| WO | 2016015213 A1 | 2/2016 |
| WO | 2016070423 A1 | 5/2016 |

OTHER PUBLICATIONS

International Preliminary Report on Patentability regarding PCT/CN2017/097837, including the English translation of the Written Opinion, dated Feb. 19, 2019.

Extended European Search Report issued in European Application No. 17841084.1, dated Mar. 16, 2020 (6 pages).

* cited by examiner

FIG. 10 ated Application No. PCT/CN2017/097837, filed on Aug. 17, 2017, which claims priority to Chinese Application No. 201610697464.1, filed on Aug. 19, 2016. The entire disclosures of the above applications are incorporated herein by reference.
METHOD FOR NOTIFYING AND DETERMINING REPETITIVE PATTERN OF UPLINK DATA, USER EQUIPMENT, AND BASE STATION

CROSS-REFERENCE TO RELATED APPLICATIONS

This application is a 371 U.S. National Stage of Intern

TECHNICAL FIELD

The present disclosure relates to Hybrid Automatic Repeat Request (HARQ), and particularly to a method for notifying a repetition pattern of uplink data, a method for determining a repetition pattern of uplink data, a user equipment and a base station.

BACKGROUND

In a 5G network-based massive Machine Type Communication (mMTC) system, an Internet of Things (IoT) equipment (user equipment) is connected to a base station to transmit uplink data. Traditionally, a UE transmits a scheduling request to the base station before transmitting uplink data, and the base station transmits an uplink grant (UL Grant) to the UE in response to the request, so as to notify resource which is allocated to the uplink data, a Modulation and Coding Scheme (MCS) and format which should be used by the uplink data, etc. When there are numerous UEs in a cell, the base station needs to transmit a large number of uplink grants, resulting in a significant increase in load and control signaling overhead of the base station.

A Grant-free scheduling is proposed to solve this problem. In particular, a set of resources and a set of scheduling information (indicating MCSs, formats, etc.) are pre-configured for a group of UEs. When a certain UE of the group of UEs is to transmit uplink data, the UE selects scheduling information and resources randomly from the pre-configured scheduling information and resources to transmit the uplink data, instead of transmitting a scheduling request and receiving an uplink grant.

Furthermore, the UE may repeatedly transmit uplink data multiple times in case of poor channel quality between the UE and the base station in order to ensure that the base station receives the data correctly. The base station performs Hybrid Automatic Repeat Request (HARQ) feedback according to a reception state of the uplink data. In particular, the base station detects the repeatedly transmitted uplink data and takes the time at which the transmission of the uplink data ends as a reference time. Feedback information for the uplink data, such as a positive acknowledgement (ACK) indicating that the uplink data has been successfully received or a negative acknowledgement (NAKC) indicating that that the uplink data has not been successfully received, is transmitted to the UE by the base station at a certain time after the reference time (HARQ time). An offset of the HARQ time relative to the reference time is predetermined.

In the mMTC system, there are multiple repetition numbers of times to be chosen for a certain frequency resource, such as 4 and 8 times. A UE may select a repetition number of times to transmit uplink data according to channel quality between the UE and a base station, and the like. However, since the base station does not know the repetition number of times selected by the UE, there may be a case in which the HARQ time determined by the base station is inconsistent with an expected HARQ time of the UE. For example, assuming that an offset of the HARQ time relative to the reference time is 4, i.e., HARQ feedback information is transmitted in the 4th subframe after the time at which the transmission of the uplink data ends, and that the repetition number of times selected by the UE is 8, thus the reference time is the 8th subframe and the expected HARQ time of the UE is the 12th subframe. Since the base station does not know the repetition number of times selected by the UE, the base station selects a repletion number of times of 4 firstly, thereby receiving and combining 4 subframes to attempt decoding. Considering that the uplink data is repeatedly transmitted, it is possible for the base station to decode the combined 4 subframes successfully and detect the uplink data. Due to the successful decoding, the base station will consider that the repetition number of times selected by the UE is 4, thereby determining the 4th subframe as the reference time and the 8th subframes as the HARQ time, which is inconsistent with the expected HARQ time of the UE. This inconsistency may lead to unnecessary retransmission, resulting in reduced frequency spectrum efficiency and increased system power consumption.

SUMMARY

According to one embodiment of the present disclosure, a method for notifying a repetition pattern of uplink data is provided, comprising: selecting one of a plurality of repetition patterns as a repetition pattern of uplink data; explicitly or implicitly notifying a base station of the selected repetition pattern by the uplink data.

According to another embodiment of the present disclosure, a method for determining a repetition pattern of uplink data is provided, comprising: receiving uplink data; determining a repetition pattern of the uplink data according to information included in the uplink data or a transmitting manner of the uplink data.

According to another embodiment of the present disclosure, a user equipment is provided, comprising: a selecting unit, configured to select one of a plurality of repetition patterns as a repetition pattern of uplink data; a notifying unit, configured to explicitly or implicitly notify a base station of the selected repetition pattern by the uplink data.

According to another embodiment of the present disclosure, a base station is provided, comprising: a receiving unit, configured to receive uplink data; a determining unit, configured to determine a repetition pattern of the uplink data according to information included in the uplink data or a transmitting manner of the uplink data

BRIEF DESCRIPTION OF THE DRAWINGS

The foregoing and other objects, features and advantages of the present disclosure will become more apparent from the detailed description of the embodiments of the present disclosure in conjunction with the accompanying drawings. The drawings are included to provide a further understanding of the embodiments of the present disclosure, constitute a part of this specification, and help to explain the present disclosure together with the embodiments of the present disclosure, but are not intended to be a limitation of the present disclosure. In the drawings, like reference numerals usually refer to like components or steps.

DETAILED DESCRIPTION

In order to make the objectives, technical solutions and advantages of the present disclosure more apparent, exemplary embodiments according to the present disclosure will be described in detail below, with reference to the drawings. Apparently, the described embodiments are only a part but not all of the embodiments of the present disclosure. It should be understood that the present disclosure is not limited by the exemplary embodiments described herein. All other embodiments obtained by a person skilled in the art based on the embodiments of the present disclosure described herein without creative effort are intended to fall into the protection scope of the present disclosure.

Figure 1:
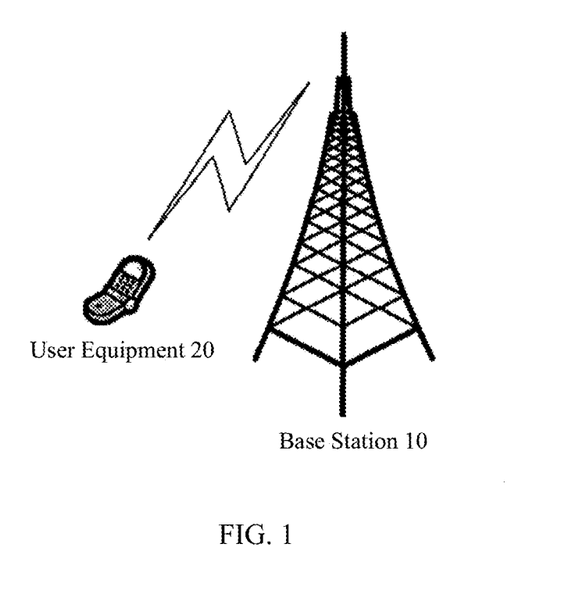
FIG. 1 is a schematic diagram of a massive Machine Type Communication (mMTC) system to which the embodiments according to the present disclosure may be applied.

FIG. 1 shows a schematic diagram of a mMTC system to which the embodiments according to the present disclosure may be applied. As shown in FIG. 1, the system includes a base station 10 and a user equipment (UE) 20. After uplink synchronization between the user equipment and the base station is achieved, the user equipment 20 transmits uplink data to the base station 10 at a time known to both of them. The base station 10 receives the uplink data and performs HARQ feedback. As described above, the base station detects the uplink data and takes the time at which the transmission of the uplink data ends as a reference time. Feedback information for the uplink data, such as a positive acknowledgement (ACK) indicating that the uplink data is successfully received or a negative acknowledgement (NAKC) indicating that that the uplink data is not successfully received, is transmitted to the UE by the base station at a time after the reference time (HARQ time). An offset of the HARQ time relative to the reference time is predetermined, and may be pre-stored in the base station and the UE, or determined by the base station and notified to the UE by various signaling. It should be appreciated that although only one UE is shown in FIG. 1, this is merely illustrative. In the mMTC system, there may be multiple UEs in a cell.

The UE may transmit uplink data multiple times. In the mMTC system, a plurality of repetition patterns are supported for a certain frequency resource. The UE may select one of the plurality of repetition patterns according to actual needs, such as a channel state between the UE and the base station, and transmit uplink data by using the repetition pattern. The repetition pattern may be a repetition number of times representing the number of times the uplink data is repeatedly transmitted, such as 4 or 8 times. The repetition pattern may also refer to other patterns of repeatedly transmitting the uplink data, for example, a time interval between the repeatedly transmitted uplink data, etc. In the following sections, embodiments of the present disclosure are described with the repetition number of times as an example of a repetition pattern. However, it should be appreciated that the embodiments of the present disclosure are also applicable to other repetition patterns.

In the embodiments of the present disclosure, in order to enable the base station to acquire the repetition number of times selected by the UE and avoid the inconsistency between the HARQ time understood by the base station and an expected HARQ time of the UE, the base station may be implicitly or explicitly notified of the repetition number of times selected by the UE.

Next, a method for notifying a repetition number of times of uplink data, a method for determining a repetition number of times of uplink data, and a corresponding UE and base station according to the embodiments of the present disclosure will be described below with reference to the drawings.

First, a method for notifying a repetition number of times of uplink data according to an embodiment of the present disclosure will be described with reference to FIG. 2. The method may be performed by a UE.

Figure 2:
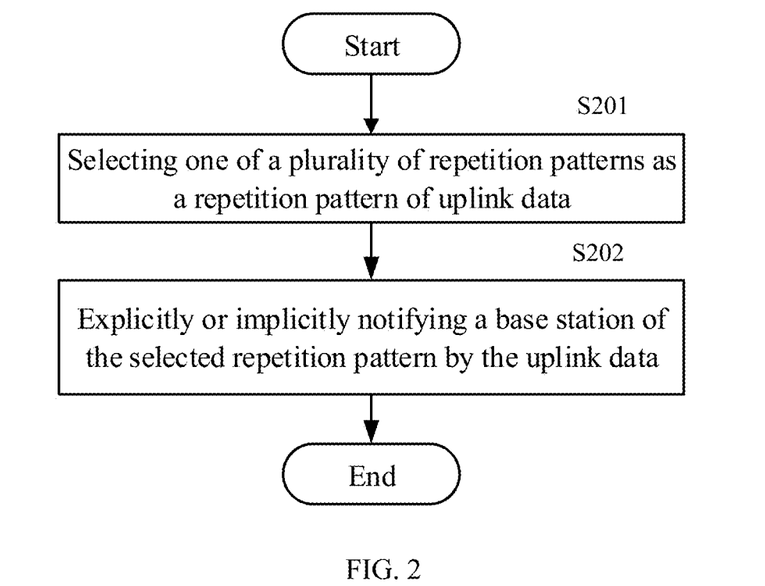
FIG. 2 shows a flow chart of a method for notifying a repetition pattern of uplink data according to an embodiment of the present disclosure.

As shown in FIG. 2, in step S201, one of a plurality of repetition numbers of times is selected as the repetition number of times of the uplink data. The repetition number of times may be selected in the manner described above, which will not be repeated herein.

Next, in step S202, the selected repetition number of times is explicitly or implicitly notified to the base station by the uplink data. A plurality of implementations may be employed to explicitly or implicitly notify the base station of the selected repetition number of times by the uplink data.

Figure 3:
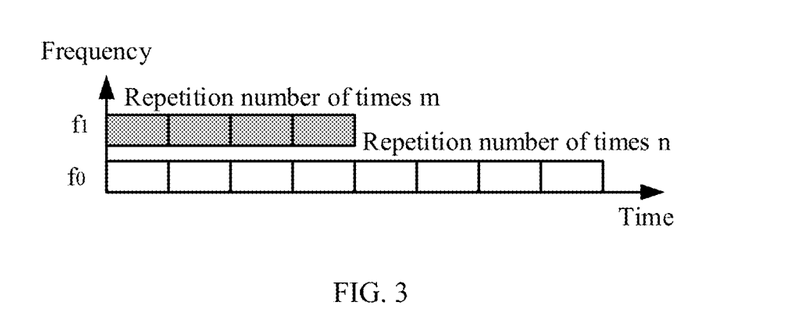
FIG. 3 shows a first implementation of the method for notifying a repetition pattern of uplink data according to an embodiment of the present disclosure.

In a first implementation, the selected repetition pattern may be implicitly notified to the base station by the uplink data, by transmitting the uplink data to the base station on a frequency corresponding to the selected repetition pattern.

In particular, a mapping relationship may be established between a plurality of repetition numbers of times and a plurality of frequencies, such that when each repetition number of times is selected, the uplink data is transmitted on a frequency corresponding to the repetition number of times. The uplink data is repeatedly transmitted for the repetition number of times. For example, a mapping relationship between a repetition number of times and a frequency may be established, such that a repetition number of times m (e.g., 4) is mapped to (corresponding to) frequency f1, a repetition number of times n (e.g., 8) is mapped to (corresponding to) frequency f2. Thus, the corresponding frequency f1 may be determined when the UE selects the repetition number of times m, and the uplink data is transmitted using the frequency f1, which is repeatedly transmitted form times; and the corresponding frequency f2 may be determined when the UE selects the repetition number of times n, and the uplink data is transmitted using the frequency f2, which is repeatedly transmitted for n times, as shown in FIG. 3. In this way, the base station may determine the repetition number of times of the uplink data by determining the transmission frequency of the uplink data. In this implementation, the mapping relationship between a repetition number of times and a frequency may be pre-stored in the UE and the base station, or may be determined by the base station and broadcast or notified to the UE by signaling, such as system information block (SIB) and the like.

Figure 4:
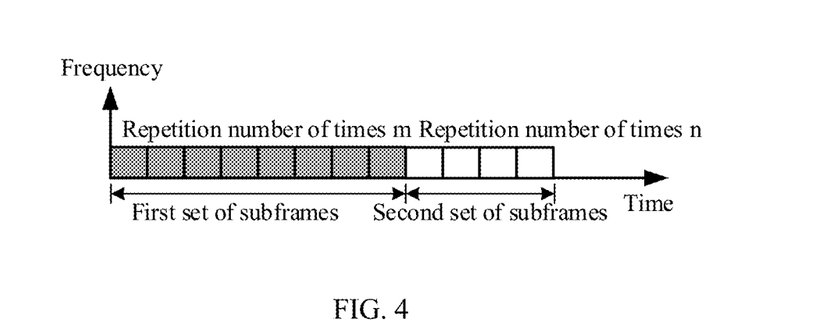
FIG. 4 shows a second implementation of the method for notifying a repetition pattern of uplink data according to an embodiment of the present disclosure.

In a second implementation, the selected repetition pattern may be implicitly notified to the base station by the uplink data, by transmitting the uplink data to the base station at the time corresponding to the selected repetition pattern.

In particular, a mapping relationship may be established between a plurality of repetition numbers of times and time (e.g., subframes), such that when each repetition number of times is selected, the uplink data is transmitted at the time (e.g., subframes) corresponding to the repetition number of times. The uplink data is repeatedly transmitted for the repetition number of times. For example, a mapping relationship between a repetition number of times and subframes may be established, such that a repetition number of times m (e.g., 4) is mapped to (corresponding to) a first set of subframes, a repetition number of times n (e.g., 8) is mapped to (corresponding to) a second set of subframes, in which the first set of subframes includes m subframes and the second set of subframes includes n subframes. Thus, the first set of subframes is determined according to the mapping relationship when the UE selects the repetition number of times m, and the uplink data is transmitted using the first set of subframes, which is repeatedly transmitted for m times; and the second set of subframes is determined according to the mapping relationship when the UE selects the repetition number of times n, and the uplink data is transmitted using the second set of subframes, which is repeatedly transmitted for n times, as shown in FIG. 4. Accordingly, the base station may determine the repetition number of times adopted by the UE according to the transmission time (subframes) of the uplink data.

In one example, the mapping relationship between a repetition number of times and transmission time (subframes) of the uplink data may be established by using a frame number (FN) and a subframe number (SFN) of a subframe included in the frame. In particular, a starting time (starting subframe) of the time at which the uplink data is transmitted in accordance with each repetition number of times (set to m) may be determined by the following equation (1), and thereby the starting subframe and the m-1 subframes after the starting subframe may be determined as the time (subframes) at which the uplink data is transmitted in accordance with the repetition number of times.

$$(10*FN+SFN) \bmod T = \text{Offset} \quad (1)$$

In equation (1), T is a length of time (which may be represented by the number of subframes) set as needed, representing a time window in which the position of the starting subframe is determined. For example, T may be set to a sum of two or more of a plurality of repetition number of times or a multiple thereof. For example, in a case that there are two repetition number of times 4 and 8, T may be set to 12 or 24. T may be also set to be greater than other values without limitation herein. Offset is an offset set for each repetition number of times, such as 0, 4, 8, or any other values, and the offset set for different repetition number of times may be different. T and Offset may be pre-configured in the UE and the base station, or may be pre-configured by the base station and broadcast or notified to the UE by signaling, such as SIB and the like. It should be noted that T and Offset should be set such that the transmission subframes determined for each repetition number of times do not overlap, i.e., the subframes for the uplink data transmitted in accordance with different repetition number of times do not contain the same subframes.

For ease of understanding, an example with two repetition number of times 4 and 8 is used for explanation. In the example, assume the T is set to 12. Offset may be set to 0 for the repetition number of times 8. In this case, at least a subframe with SFN of 2 in a frame with frame number of 1 satisfies the above equation (1). Therefore, the subframe with SFN of 2 in the frame with frame number of 1 may be determined as the starting subframe at which the uplink data is transmitted in accordance with the repetition number of times 8, and the starting subframe and the subsequent 7 subframes may be determined as subframes at which the uplink data is transmitted in accordance with the repetition number of times 8. Thus, on the base station side, when the base station determines that the received uplink data is located in 8 subframes starting from the subframe with SFN of 2 in the frame with frame number of 1, it may be determined that the selected repetition number of times is 8. In this case, subframes other than the subframes at which the uplink data is transmitted in accordance with the repetition number of times 8 may be determined as subframes at which the uplink data is transmitted in accordance with the repetition number of times 4. Alternatively, Offset may be set to 8 for the repetition number of times 4. In this case, at least a subframe with SFN of 10 in a frame with frame number of 1 satisfies the above equation. Therefore, a subframe with SFN of 10 in the frame with frame number of 1 may be determined as the starting subframe at which the uplink data is transmitted in accordance with the repetition number of times 4, and the starting subframe and the subsequent 3 subframes may be determined as subframes at which the uplink data is transmitted in accordance with the repetition number of times 4. In this case, subframes other than the subframes at which the uplink data is transmitted in accordance with the repetition number of times 4 may be determined as subframes at which the uplink data is transmitted in accordance with the repetition number of times 8.

Figure 5:
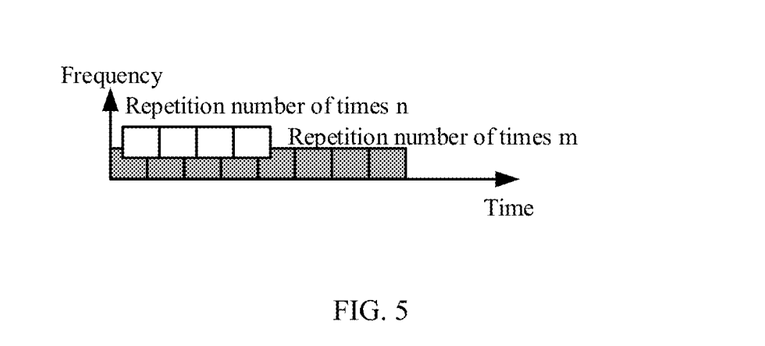
FIG. 5 shows a third implementation of the method for notifying a repetition pattern of uplink data according to an embodiment of the present disclosure.

In a third implementation, the selected repetition pattern may be implicitly notified to the base station by the uplink data, by generating the uplink data using a scrambling sequence corresponding to the selected repetition pattern and transmitting the uplink data to the base station.

In particular, a parameter corresponding to the selected repetition number of times (i.e., a parameter specific to the repetition number of times) may be used when generating a scrambling sequence, so that the generated scrambling sequence is also specific to the repetition number of times, i.e., is different from a scrambling sequence generated using a parameter specific to other repetition number of times. In this way, when selecting the repetition number of times m, the UE may generate a scrambling sequence corresponding to the repetition number of times m with a parameter specific to the repetition number of times m, and scramble data to be transmitted with the scrambling sequence to generate the uplink data; and when selecting the repetition number of times n, the UE may generate a scrambling sequence corresponding to the repetition number of times n with a parameter specific to the repetition number of times n, and scramble data to be transmitted with the scrambling sequence to generate the uplink data. Then, the uplink data is repeatedly transmitted for the repetition number of times to the base station. Accordingly, a parameter specific to each repetition number of times may be pre-configured in the UE and the base station, or configured by the base station and broadcast or notified to the UE by signaling, such as SIB and the like.

In an example, for each repetition number of times, a scrambling sequence c(n) specific to the repetition number of times may be generated based on a pseudo-random sequence in accordance with the following equation (2):

$$c(n)=(x_1(n+N_c)+x_2(n+N_c))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2 \quad (2)$$

where, Nc=1600, $x_1(0)=1$, $x_1(n)=0$, n=1, 2, 3, ..., 30. $x_2(i)$ may be derived according to the following equation (3):

$$c_{init}=\Sigma_{i=0}^{30}x_2(i)\cdot 2^i \quad (3)$$

wherein, $$c_{init}=n_{Repetition}\cdot 2^{14+q\cdot 213}+\lfloor n_s/2 \rfloor\cdot 2^9+N_{ID}^{cell} \quad (4)$$

In equation (4), $N_{ID}^{Cell}$ is a cell ID, $n_s$ is a time slot number, $n_{Repetition}$ is a parameter specific to the repetition number of times, which may be, for example, equal to the repetition number of times, or may be any value specific to the repetition number of times determined according to the repetition number of times. It can be seen that, since a parameter specific the selected repetition number of times is used when generating the scrambling sequence, the generated scrambling sequence will also be specific to the selected repetition number of times and be different from a scrambling sequence generated using a parameter specific to other repetition number of times.

In a fourth implementation, the selected repetition pattern may be implicitly notified to the base station by the uplink data, by generating the uplink data using scheduling information corresponding to the selected repetition pattern and transmitting the uplink data to the base station.

In particular, a set of scheduling information is pre-configured in the mMTC system, as described above, and each scheduling information, for example, may indicate an MCS, a data format and the like usable for the uplink data. A mapping relationship may be established between a plurality of repetition number of times and the set of scheduling information, such that when each repetition number of times is selected by the UE, the uplink data is generated with scheduling information corresponding to the repetition number of times. Then, the uplink data is repeatedly transmitted for the repetition number of times to the base station. For example, when the UE selects a repetition number of times m, scheduling information corresponding to the repetition number of times m may be determined, and the uplink data is generated using the scheduling information, and the uplink data is then repeatedly transmitted for m times to the base station; and when the UE selects a repetition number of times n, scheduling information corresponding to the repetition number of times n may be determined, and the uplink data is generated using the scheduling information, and the uplink data is then repeatedly transmitted for n times to the base station. For example, a mapping relationship may be established between the MCS, as an example of scheduling information, and each repetition number of times, such that when the UE selects the repetition number of times m, the uplink data is generated with a MCS0 corresponding to the repetition number of times m, and when the UE selects the repetition number of times n, the uplink data is generated with a MCS1 corresponding to the repetition number of times n. Accordingly, the base station may determining the repetition number of times selected by the UE by determining scheduling information (e.g., a MCS) used to generate the uplink data. The mapping relationship between scheduling information and a repetition number of times may be pre-configured in the UE and the base station, or may be configured by the base station and broadcast or notified to the UE by signaling, such as s SIB, and the like.

Figure 6:
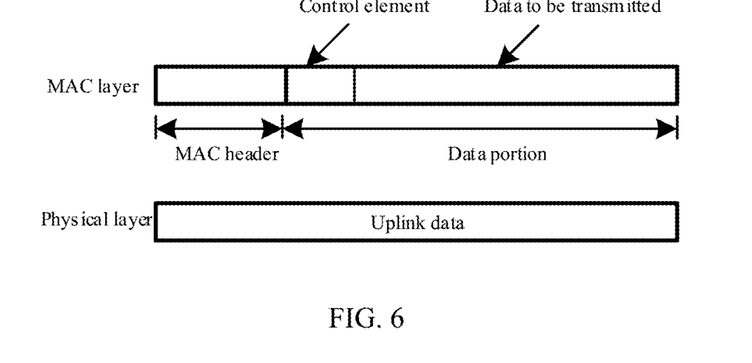
FIG. 6 shows a fifth implementation of the method for notifying a repetition pattern of uplink data according to an embodiment of the present disclosure.

In a fifth implementation, the selected repetition pattern may be explicitly notified to the base station by the uplink data, by generating uplink data including information indicating the selected repetition pattern and transmitting the uplink data to the base station.

In particular, in a Medium Access Control (MAC) layer, data to be transmitted delivered from a higher layer (e.g., a Packet Data Convergence Protocol (PDCP) layer) is received and processed (e.g., split and/or concatenated), and then an MAC header is added to the processed data to generate uplink data. The uplink data is then repeatedly transmitted for the repetition number of times to the base station through a physical layer. In the embodiment of the present disclosure, a control element (or field) including information indicating the selected repetition number of times may be defined, and the control element is multiplexed with the processed data in the MAC layer, and an MAC header is then added to the multiplexed data to generate uplink data including information indicating the selected repetition number of times, as shown in FIG. 6. Alternatively, the control element may be added to an MAC header, and the MAC header is added to the processed data to generate uplink data including information indicating the selected repetition number of times. In this way, the base station may detect the uplink data in the MAC layer and extract the control element in the uplink data to determine the selected repetition number of times. It should be appreciated that the MAC layer is taken as an example to explain the location of adding the information indicating the selected repetition number of times, but this is merely illustrative. The information may also be added in layers other than the MAC layer (e.g., layers above the MAC layer), as long as the finally generated uplink data contains the information.

Figure 7:
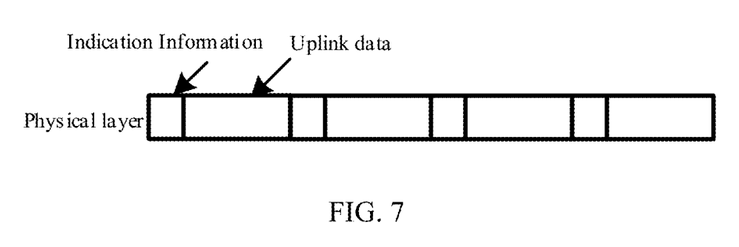
FIG. 7 shows a sixth implementation of the method for notifying a repetition pattern of uplink data according to an embodiment of the present disclosure.

In a sixth implementation, the selected repetition pattern may be explicitly notified to the base station by the uplink data, by multiplexing the uplink data with control information including information indicating the selected repetition pattern and transmitting the multiplexed data to the base station.

In particular, indication information indicating the selected repetition number of times may be defined, and the control information is multiplexed with the uplink data in a physical layer to generate multiplexed data. For example, the indication information may be time division multiplexed or frequency division multiplexed with the uplink data. FIG. 7 shows an example of time division multiplexing the indication information with the uplink data. Then, the multiplexed data may be repeatedly transmitted to the base station in accordance with the selected repetition number of times. In this way, the base station may detect the uplink data and extract the indication information in the uplink data to determine the selected repetition number of times.

The UE may explicitly or implicitly notify the base station of the repetition pattern of the uplink data with the method described above. It should be noted that the UE may adopt any of the foregoing various implementations as needed, as long as the UE and the base station come to an agreement in advance.

A method for determining a repetition pattern of uplink data according to an embodiment of the present disclosure will be described below with reference to FIG. 8. The method may be performed by a base station. Again, the description is made herein with repetition number of times as an example of repetition pattern, but this is merely illustrative and the following description is also applicable to other repetition patterns.

Figure 8:
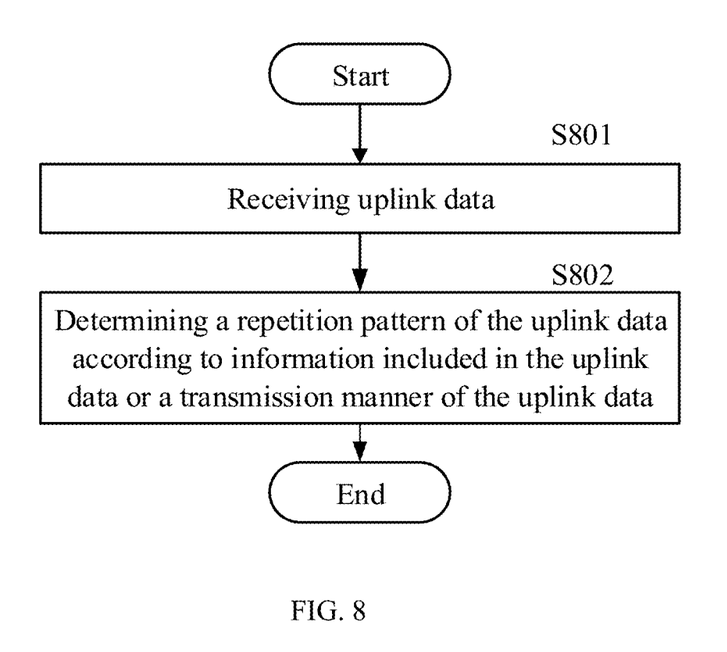
FIG. 8 shows a flow chart of a method for determining a repetition pattern of uplink data according to an embodiment of the present disclosure.

As shown in FIG. 8, in step S801, uplink data is received. The base station may receive the uplink data in a manner well known in the art, which will not be repeated herein.

Next, in step S802, the repetition number of times of the uplink data is determined according to information included in the uplink data or a transmission manner of the uplink data. Since a plurality of implementations may be used to notify the selected repetition number of times in step S202, a corresponding plurality of implementations may be used to determine the repetition number of times of the uplink data in step S802.

In the first implementation described with reference to step S202, the selected repetition number of times is implicitly notified to the base station by the uplink data, by transmitting the uplink data to the base station on a frequency corresponding to the selected repetition number of times. Accordingly, in step S802, a repetition number of times corresponding to the transmission frequency of the uplink data may be determined as the repetition number of times of the uplink data.

In particular, the transmission frequency of the uplink data may be determined, and then a repetition number of times corresponding to the transmission frequency is determined as the repetition number of times of the uplink data according to a mapping relationship between respective repetition number of times and different transmission frequencies. Then, at a time when the number of uplink data received is equal to the repetition number of times, the uplink data of the number equal to the repetition number of times may be combined, and the combined data is blindly decoded to detect the uplink data. For example, in the example shown in FIG. 3, when it is determined that the transmission frequency of the uplink data is f1 in step S802, the received m subframes may be combined for blind decoding at the time of receiving m uplink subframes, thereby the uplink subframes are detected.

In the second implementation described with reference to step S202, the selected repetition number of times is implicitly notified to the base station by the uplink data, by transmitting the uplink data to the base station at a time corresponding to the selected repetition number of times. Accordingly, in step S802, a repetition number of times corresponding to the transmission time of the uplink data may be determined as the repetition number of times of the uplink data.

In particular, in step S802, the transmission time of the uplink data may be determined, and then a repetition number of times corresponding to the transmission frequency is determined as the repetition number of times of the uplink data according to a mapping relationship between respective repetition number of times and corresponding transmission time. Then, at a time when the number of uplink data received is equal to the repetition number of times, the uplink data of the number equal to the repetition number of times may be combined, and the combined data is blindly decoded to detect the uplink data.

More particularly, for each repetition number of times (denoted as m for convenience of explanation), the transmission time at which the uplink data is transmitted in accordance with the repetition number of times may be determined in the manner described above with respect to step S202, for example, based on the equation (2), and thereby a mapping relationship between respective repetition number of times and transmission time corresponding to the repetition number of times is established and may be pre-stored in the base station. In step S802, the transmission time of the received uplink data may be determined, and then, according to the mapping relationship, it is determined whether the transmission time of the received uplink data belongs to transmission time corresponding to a certain repetition number of times. If the transmission time of the received uplink data belongs to transmission time corresponding to a certain repetition number of times, the repetition number of times may be determined as the repetition number of times of the received uplink data. Then, the received uplink data may be combined for blind decoding at a time when the number of uplink data received is equal to the repetition number of times, thereby detecting the uplink subframes.

In the third implementation described with reference to step S202, the selected repetition number of times is implicitly notified to the base station by the uplink data, by generating the uplink data using a scrambling sequence corresponding to the selected repetition number of times and transmitting the uplink data to the base station. Accordingly, in step S802, the repetition number of times of the uplink data may be determined by determining the scrambling sequence used by the received uplink data.

In particular, in step S802, a repetition number of times may be selected from the plurality of repetition number of times, and the uplink data may be detected with the selected repetition number of times and a scrambling sequence corresponding to the selected repetition number of times. If the uplink data is successfully detected, the selected repetition number of times is determined as the repetition number of times of the uplink data.

More particularly, for each repetition number of times, a scrambling sequence may be generated in the same manner as the UE using a parameter corresponding to the repetition number of times (i.e., a parameter specific to the repetition number of times). For example, a scrambling sequence may be generated in accordance with the above equation (2). The parameter specific to each repetition number of times may be pre-configured in the UE and the base station, or may be configured by the base station, as described above. In step S802, a repetition number of times may be selected from the plurality of repetition number of times, and, at a time when the number of uplink data received is equal to the selected repetition number of times, a combined data obtained by combining the uplink data of the number equal to the selected repetition number of times is decoded with a scrambling sequence corresponding to the selected repetition number of times, so as to attempt detecting the uplink data. If the uplink data is successfully detected, it indicates that the selected repetition number of times is correct, and thus the selected repetition number of times may be determined as the repetition number of times of the uplink data. On the other hand, if the uplink data is not detected, another repetition number of times may be selected from the plurality of repetition number of times, and, at a time when the number of uplink data received is equal to the selected repetition number of times, a combined data obtained by combining the uplink data of the number equal to the selected repetition number of times is decoded with a scrambling sequence corresponding to the selected repetition number of times to attempt detecting the uplink data.

The above operations of selecting and decoding attempt are repeated until the uplink data is successfully detected, and then the repetition number of times corresponding to the successful detection of the uplink data is determined as the repetition number of times of the uplink data. In this implementation, the detected uplink data is the uplink data transmitted by the UE.

In the fourth implementation described with reference to step S202, the selected repetition pattern is implicitly notified to the base station by the uplink data, by generating the uplink data using scheduling information corresponding to the selected repetition pattern and transmitting the uplink data to the base station. Accordingly, in step S802, the repetition number of times of the uplink data may be determined by determining the scheduling information used by the received uplink data.

In particular, in step S802, a repetition number of times may be selected from the plurality of repetition number of times, and the uplink data may be detected with the selected repetition number of times and scheduling information corresponding to the selected repetition number of times. If the uplink data is successfully detected, the selected repetition number of times is determined as the repetition number of times of the uplink data.

More particularly, a set of scheduling information is pre-configured in the mMTC system, as described above, and each scheduling information, for example, may indicate an MCS, a data format and the like usable for the uplink data. A mapping relationship may be established between the plurality of repetition number of times and the set of scheduling information, and may be pre-configured in the UE and the base station, or configured by the base station and broadcast or notified to the UE by signaling, such as SIB, and the like. In step S802, a repetition number of times may be selected from the plurality of repetition number of times, and, at a time when the number of uplink data received is equal to the selected repetition number of times, a combined data obtained by combining the uplink data of the number equal to the selected repetition number of times is blindly decoded with scheduling information (e.g., an MCS) corresponding to the selected repetition number of times, to attempt detecting the uplink data. If the uplink data is successfully detected, it indicates that the selected repetition number of times is correct, and thus the selected repetition number of times may be determined as the repetition number of times of the uplink data. On the other hand, if the uplink data is not detected, another repetition number of times may be selected from the plurality of repetition number of times, and, at a time when the number of uplink data received is equal to the selected repetition number of times, a combined data obtained by combining the uplink data of the number equal to the selected repetition number of times is blindly decoded with scheduling information (e.g., an MCS) corresponding to the selected repetition number of times to attempt detecting the uplink data. The above operations of selecting and decoding attempt are repeated until the uplink data is successfully detected, and then the repetition number of times corresponding to the successful detection of the uplink data is determined as the repetition number of times of the uplink data. In this implementation, the detected uplink data is the uplink data transmitted by the UE.

In the fifth implementation described with reference to step S202, the selected repetition number of times is explicitly notified to the base station by the uplink data, by generating uplink data including information indicating the selected repetition number of times and transmitting the uplink data to the base station. Accordingly, in step S802, the repetition number of times of the uplink data may be determined by extracting the information indicating the repetition number of times selected by the UE from the received uplink data.

In particular, in step S802, a repetition number of times may be selected from the plurality of repetition number of times, and the uplink data may be detected with the selected repetition number of times. If the uplink data is successfully detected, the information is extracted from the uplink data to determine the selected repetition number of times indicated by the information as the repetition number of times of the uplink data.

More particularly, in step S802, a repetition number of times may be selected from the plurality of repetition number of times, and, at a time when the number of uplink data received is equal to the selected repetition number of times, a combined data obtained by combining the uplink data of the number equal to the selected repetition number of times is blindly decoded to attempt detecting the uplink data. If the uplink data is successfully detected, the information is extracted from the uplink data to determine the selected repetition number of times indicated by the information as the repetition number of times of the uplink data. On the other hand, if the uplink data is not detected, another repetition number of times may be selected from the plurality of repetition number of times, and, at a time when the number of uplink data received is equal to the selected repetition number of times, a combined data obtained by combining the uplink data of the number equal to the selected repetition number of times is blindly decoded to attempt detecting the uplink data. The above operations of selecting and decoding attempt are repeated until the uplink data is successfully detected, and then the information is extracted from the uplink data to determine the selected repetition number of times indicated by the information as the repetition number of times of the uplink data. Then, at a time when the number of uplink data received is equal to the repetition number of times indicated by the information, the received uplink data is combined for blind decoding, thereby detecting the uplink subframes. Certainly, in some cases, a repetition number of times selected when determining the repetition number of times is the same as the repetition number of times indicated by the information, such that the uplink data detected when determining the repetition number of times is the uplink data transmitted by the UE.

In the sixth implementation described with reference to step S202, the selected repetition number of times is explicitly notified to the base station by the uplink data, by multiplexing the uplink data with control information including information indicating the selected repetition number of times and transmitting the multiplexed data to the base station. Accordingly, in step S802, the repetition number of times of the uplink data may be determined by detecting the control information multiplexed with the uplink data.

In particular, in step S802, a repetition number of times may be selected from the plurality of repetition number of times, and the control information multiplexed with the uplink data is detected with the selected repetition number of times. If the control information is successfully detected, the repetition number of times indicated by the control information is determined as the repetition number of times of the uplink data.

More particularly, in step S802, a repetition number of times may be selected from the plurality of repetition number of times, and, at a time when the number of uplink data received is equal to the selected repetition number of times, the control information multiplexed with the uplink data is extracted, the extracted control information is combined, and the combined control information is blindly decoded to attempt detecting the control information. If the control information is successfully detected, the repetition number of times indicated by the control information is determined as the repetition number of times of the uplink data. On the other hand, if the control information is not detected, another repetition number of times may be selected from the plurality of repetition number of times, and, at a time when the number of uplink data received is equal to the selected repetition number of times, the control information multiplexed with the uplink data is extracted, the extracted control information is combined, and the combined control information is blindly decoded to attempt detecting the control information. The above operations of selecting and decoding attempt are repeated until the control information is successfully detected, and then the repetition number of times indicated by the control information is determined as the repetition number of times of the uplink data. Then, at a time when the number of uplink data received is equal to the repetition number of times indicated by the control information, the received uplink data is combined for blind decoding, thereby detecting the uplink subframes. In this implementation, since the manner in which the UE multiplexes the control information with the uplink data is known to the base station, the base station may extract the control information multiplexed with the uplink data according to the manner.

After the uplink subframes are detected, the base station may determine the time at which the transmission of the repeatedly transmitted uplink data ends as a reference time, and determine an HARQ time according to the reference time and a predetermined offset of the HARQ time relative to the reference time, and transmit feedback information for the uplink data to the UE at the HARQ time.

With the above method, the repetition pattern of the uplink data may be correctly determined according to the information included in the uplink data transmitted by the UE and the transmission manner of the uplink data, and thus the reference time may be correctly determined, so that the HARQ time determined according to the reference time is consistent with the expected HARQ time of the UE, thereby avoiding the problem of reduced frequency spectrum efficiency and increased system power consumption caused by the inconsistency between the expected HARQ time of the UE and the HARQ time determined by the base station.

A UE according to an embodiment of the present disclosure will be described below with reference to FIG. 9. The UE may perform the method described with reference to FIG. 2.

Figure 9:
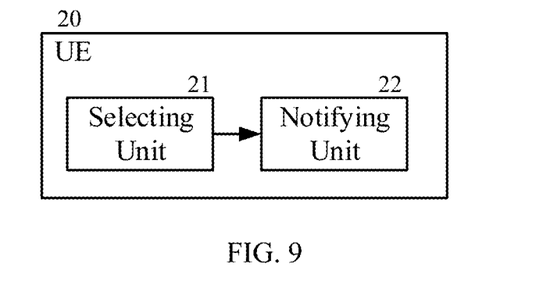
FIG. 9 shows a block diagram of a user equipment according to an embodiment of the present disclosure.

As shown in FIG. 9, the UE 20 includes a selecting unit 21 and a notifying unit 22. It should be noted that, for the sake of simplicity, only two units that are closely related to the present disclosure in the UE are shown herein, but this is merely illustrative. The UE may include other units as needed. Furthermore, since part of the details of functions executed by the respective units of the UE is the same as the method described above with reference to FIG. 2, description of the same contents are omitted herein for the sake of simplicity.

The selecting unit 21 may select one of a plurality of repetition number of times as a repetition number of times of uplink data. The repetition number of times may be selected in the manner described above, which will not be repeated herein.

The notifying unit 22 may explicitly or implicitly notify a base station of the selected repetition number of times by the uplink data. The notifying unit 22 may employ a plurality of implementations to explicitly or implicitly notify a base station of the selected repetition number of times by the uplink data.

In a first implementation, the notifying unit 22 may implicitly notify the base station of the selected repetition pattern by the uplink data, by transmitting the uplink data to the base station on a frequency corresponding to the selected repetition pattern.

In particular, a mapping relationship may be established between a plurality of repetition numbers of times and a plurality of frequencies in the manner described above, such that when each repetition number of times is selected by the selecting unit 21, the notifying unit 22 transmits the uplink data on a frequency corresponding to the repetition number of times. The uplink data is repeatedly transmitted for the repetition number of times. For example, the notifying unit 22 may determine a corresponding frequency f1 when the selecting unit 21 selects a repetition number of times m, and transmit the uplink data using the frequency f1, which is repeatedly transmitted for m times; and the notifying unit 22 may determine a corresponding frequency f2 when the selecting unit 21 selects a repetition number of times n, and transmit the uplink data using the frequency f2, which is repeatedly transmitted for n times. In this implementation, the mapping relationship between a repetition number of times and a frequency may be pre-stored in the UE and the base station, or may be determined by the notifying unit 22 and broadcast or notified to the UE by signaling, such as system information block (SIB) and the like.

In a second implementation, the notifying unit 22 may implicitly notify the base station of the selected repetition pattern by the uplink data, by transmitting the uplink data to the base station at a time corresponding to the selected repetition pattern.

In particular, a mapping relationship may be established between a plurality of repetition numbers of times and time (e.g., subframes), as described above, such that when each repetition number of times is selected, the uplink data is transmitted at a time (e.g., subframes) corresponding to the repetition number of times. The uplink data is repeatedly transmitted for the repetition number of times. For example, a mapping relationship between a repetition number of times and subframes may be established, such that a repetition number of times m is mapped to a first set of subframes, a repetition number of times n is mapped to a second set of subframes, in which the first set of subframes includes m subframes and the second set of subframes includes n subframes. Thus, the notifying unit 22 determines the first set of subframes according to the mapping relationship when the selecting unit 21 selects the repetition number of times m, and transmits the uplink data using the first set of subframes, which is repeatedly transmitted for m times; and the notifying unit 22 determines the second set of subframes according to the mapping relationship when the selecting unit 21 selects the repetition number of times n, and transmits the uplink data using the second set of subframes, which is repeatedly transmitted for n times. The mapping relationship between a repetition number of times and transmission time (subframes) of the uplink data may be established in the manner described above, for example, using a frame number (FN) of a frame and a subframe number (SFN) of a subframe included in the frame and the above equation (1), which will not be repeated here.

In a third implementation, the notifying unit 22 may implicitly notify the base station of the selected repetition pattern by the uplink data, by generating the uplink data using a scrambling sequence corresponding to the selected repetition pattern and transmitting the uplink data to the base station.

In particular, the notifying unit 22 may use a parameter corresponding to the selected repetition number of times (i.e., a parameter specific to the repetition number of times) when generating a scrambling sequence, so that the generated scrambling is also specific to the repetition number of times, i.e., is different from a scrambling sequence generated using a parameter specific to other repetition number of times. In this way, when the selecting unit 21 selects the repetition number of times m, the notifying unit 22 may generate a scrambling sequence corresponding to the repetition number of times m with a parameter specific to the repetition number of times m, and may scramble data to be transmitted with the scrambling sequence to generate the uplink data; and when the selecting unit 21 selects the repetition number of times n, the notifying unit 22 may generate a scrambling sequence corresponding to the repetition number of times n with a parameter specific to the repetition number of times n, and may scramble data to be transmitted with the scrambling sequence to generate the uplink data. Then, the notifying unit 22 repeatedly transmits the uplink data for the repetition number of times to the base station. The notifying unit 22 may generate a scrambling sequence with a parameter specific to the repetition number of times in the manner described above, for example, using the above equation (3), which will not be repeated here.

In a fourth implementation, the notifying unit 22 may implicitly notify the base station of the selected repetition pattern by the uplink data, by generating the uplink data using scheduling information corresponding to the selected repetition pattern and transmitting the uplink data to the base station.

In particular, a set of scheduling information is preconfigured in the mMTC system, as described above, and each scheduling information, for example, may indicate an MCS, a data format and the like usable for the uplink data. A mapping relationship may be established between a plurality of repetition number of times and the set of scheduling information, such that when each repetition number of times is selected by the selecting unit 21, the notifying unit 22 generates the uplink data with scheduling information corresponding to the repetition number of times. Then, the notifying unit 22 repeatedly transmitted the uplink data for the repetition number of times to the base station. For example, when the selecting unit 21 selects a repetition number of times m, the notifying unit 22 may determine scheduling information corresponding to the repetition number of times m, generate the uplink data using the scheduling information, and then repeatedly transmit the uplink data for m times to the base station; and when the selecting unit 21 selects a repetition number of times n, the notifying unit 22 may determine scheduling information corresponding to the repetition number of times n, generate the uplink data using the scheduling information, and then repeatedly transmit the uplink data for n times to the base station. The mapping relationship between scheduling information and a repetition number of times may be pre-configured in the UE and the base station, or may be configured by the notifying unit 22 and broadcast or notified to the UE by signaling, such as s SIB and the like.

In a fifth implementation, the notifying unit 22 may explicitly notify the base station of the selected repetition pattern by the uplink data, by generating uplink data including information indicating the selected repetition pattern and transmitting the uplink data to the base station.

In particular, a control element (or field) including information indicating the selected repetition number of times may be defined. The notifying unit 22 may multiplex the control element with the processed data in an MAC layer, and then add an MAC header to the multiplexed data to generate uplink data including information indicating the selected repetition number of times. Alternatively, the notifying unit 22 may add the control element to an MAC header, and add the MAC header to the processed data to generate uplink data including information indicating the selected repetition number of times. It should be appreciated that the MAC layer is taken as an example to explain the location of adding the information indicating the selected repetition number of times, but this is merely illustrative. The information may also be added in layers other than the MAC layer (e.g., layers above the MAC layer), as long as the finally generated uplink data contains the information.

In a sixth implementation, the notifying unit 22 may explicitly notify the base station of the selected repetition pattern by the uplink data, by multiplexing the uplink data with control information including information indicating the selected repetition pattern and transmitting the multiplexed data to the base station.

In particular, indication information indicating the selected repetition number of times may be defined. The notifying unit 22 may multiplex the control information with the uplink data in a physical layer to generate multiplexed data. For example, the indication information may be time division multiplexed or frequency division multiplexed with the uplink data. Then, the notifying unit 22 may repeatedly transmit the multiplexed data to the base station in accordance with the selected repetition number of times.

It can be seen that the UE according to the embodiment of the present disclosure may explicitly or implicitly notify the base station of the repetition pattern of the uplink data.

A base station according to an embodiment of the present disclosure may be described below with reference to FIG. 10. The base station may perform the method described with reference to FIG. 8.

Figure 10:
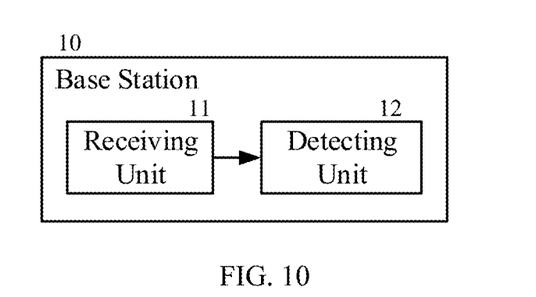
FIG. 10 shows a block diagram of a base station according to an embodiment of the present disclosure.

As shown in FIG. 10, the base station 10 includes a receiving unit 11 and a detecting unit 12. It should be noted that, for the sake of simplicity, only two units that are closely related to the present disclosure in the base station are shown herein, but this is merely illustrative. The base station may include other units as needed. Furthermore, since part of the details of functions performed by the respective units of the base station are the same as the method described above with reference to FIG. 8, description of the same contents are omitted herein for the sake of simplicity.

The receiving unit 11 may receive uplink data. The uplink data may be received in a manner well known in the art, which will not be repeated herein.

The detecting unit 12 may determine a repetition number of times of the uplink data according to information included in the uplink data and a transmission manner of the uplink data. Since a plurality of implementations may be used in the UE to notify the selected repetition number of times, a corresponding plurality of implementations may be used in the base station to determine the repetition number of times of the uplink data.

In the above first implementation employed by the UE, the selected repetition number of times is implicitly notified to the base station by the uplink data, by transmitting the uplink data to the base station on a frequency corresponding to the selected repetition number of times. Accordingly, the detecting unit 12 may determine a repetition number of times corresponding to the transmission frequency of the uplink data as the repetition number of times of the uplink data.

In particular, the detecting unit 12 may determine the transmission frequency of the uplink data, and then determine a repetition number of times corresponding to the transmission frequency as the repetition number of times of the uplink data according to a mapping relationship between respective repetition number of times and different transmission frequencies. Then, at a time when the number of uplink data received is equal to the repetition number of times, the detecting unit 12 may combine the uplink data of the number equal to the repetition number of times, and blindly decode the combined data to detect the uplink data.

In the above second implementation employed by the UE, the selected repetition number of times is implicitly notified to the base station by the uplink data, by transmitting the uplink data to the base station at a time corresponding to the selected repetition number of times. Accordingly, the detecting unit 12 may determine a repetition number of times corresponding to the transmission time of the uplink data as the repetition number of times of the uplink data.

In particular, the detecting unit 12 may determine the transmission time of the uplink data, and then determine a repetition number of times corresponding to the transmission frequency as the repetition number of times of the uplink data according to a mapping relationship between respective repetition number of times and corresponding transmission time. Then, at a time when the number of uplink data received is equal to the repetition number of times, the detecting unit 12 may combine the uplink data of the number equal to the repetition number of times, and blindly decode the combined data to detect the uplink data.

More particularly, for each repetition number of times, the transmission time at which the uplink data is transmitted in accordance with the repetition number of times may be determined in the manner described above with respect to step S202, for example, based on the equation (2), and thereby a mapping relationship between respective repetition number of times and transmission time corresponding to the repetition number of times is established and may be pre-stored in the base station. The detecting unit 12 may determine the transmission time of the received uplink data, and then, according to the mapping relationship, determine whether the transmission time of the received uplink data is transmission time corresponding to a certain repetition number of times. If the transmission time of the received uplink data is transmission time corresponding to a certain repetition number of times, the repetition number of times may be determined as the repetition number of times of the received uplink data. Then, the detecting unit 12 may combine the received uplink data for blind decoding at a time when the number of uplink data received is equal to the repetition number of times, thereby detecting the uplink subframes.

In the above third implementation employed by the UE, the selected repetition number of times is implicitly notified to the base station by the uplink data, by generating the uplink data using a scrambling sequence corresponding to the selected repetition number of times and transmitting the uplink data to the base station. Accordingly, the detecting unit 12 may determine the repetition number of times of the uplink data by determining the scrambling sequence used by the received uplink data.

In particular, the detecting unit 12 may select a repetition number of times from the plurality of repetition number of times, and detect the uplink data by using the selected repetition number of times and a scrambling sequence corresponding to the selected repetition number of times. If the uplink data is successfully detected, the selected repetition number of times is determined as the repetition number of times of the uplink data.

More particularly, for each repetition number of times, the detecting unit 12 may generate a scrambling sequence in the same manner as the UE using a parameter corresponding to the repetition number of times (i.e., a parameter specific to the repetition number of times). For example, a scrambling sequence may be generated in accordance with the above equation (2). The parameter specific to each repetition number of times may be pre-configured in the UE and the base station, or may be configured by the base station, as described above. The detecting unit 12 may select a repetition number of times from the plurality of repetition number of times, and, at a time when the number of uplink data received is equal to the selected repetition number of times, decode a combined data obtained by combining the uplink data of the number equal to the selected repetition number of times with a scrambling sequence corresponding to the selected repetition number of times to attempt detecting the uplink data. If the uplink data is successfully detected, it indicates that the selected repetition number of times is correct, and thus the detecting unit 12 may determine the selected repetition number of times as the repetition number of times of the uplink data. On the other hand, if the uplink data is not detected, the detecting unit 12 may select another repetition number of times from the plurality of repetition number of times, and, at a time when the number of uplink data received is equal to the selected repetition number of times, decode a combined data obtained by combining the uplink data of the number equal to the selected repetition number of times with a scrambling sequence corresponding to the selected repetition number of times to attempt detecting the uplink data. The detecting unit 12 may repeat the above operations of selecting and decoding attempt until the uplink data is successfully detected, and then determine the repetition number of times corresponding to the successful detection of the uplink data as the repetition number of times of the uplink data. In this implementation, the detected uplink data is the uplink data transmitted by the UE.

In the fourth implementation employed by the UE, the selected repetition pattern is implicitly notified to the base station by the uplink data, by generating the uplink data using scheduling information corresponding to the selected repetition pattern and transmitting the uplink data to the base station. Accordingly, the detecting unit 12 may determine the repetition number of times of the uplink data by determining the scheduling information used by the received uplink data.

In particular, the detecting unit 12 may select a repetition number of times from the plurality of repetition number of times, and detect the uplink data by using the selected repetition number of times and scheduling information corresponding to the selected repetition number of times. If the uplink data is successfully detected, the selected repetition number of times is determined as the repetition number of times of the uplink data.

More particularly, a set of scheduling information is pre-configured in the mMTC system, as described above, and each scheduling information, for example, may indicate an MCS, a data format and the like usable for the uplink data. A mapping relationship may be established between the plurality of repetition number of times and the set of scheduling information, and may be pre-configured in the UE and the base station, or configured by the base station and broadcast or notified to the UE by signaling, such as SIB, and the like. The detecting unit 12 may select a repetition number of times from the plurality of repetition number of times, and, at a time when the number of uplink data received is equal to the selected repetition number of times, blindly decode a combined data obtained by combining the uplink data of the number equal to the selected repetition number of times with scheduling information (e.g., an MCS) corresponding to the selected repetition number of times to attempt detecting the uplink data. If the uplink data is successfully detected, it indicates that the selected repetition number of times is correct, and thus the detecting unit 12 may determine the selected repetition number of times as the repetition number of times of the uplink data. On the other hand, if the uplink data is not detected, the detecting unit 12 may select another repetition number of times from the plurality of repetition number of times, and, at a time when the number of uplink data received is equal to the selected repetition number of times, blindly decode a combined data obtained by combining the uplink data of the number equal to the selected repetition number of times with scheduling information (e.g., an MCS) corresponding to the selected repetition number of times to attempt detecting the uplink data. The detecting unit 12 may repeat the the above operations of selecting and decoding attempt until the uplink data is successfully detected, and then determine the repetition number of times corresponding to the successful detection of the uplink data as the repetition number of times of the uplink data. In this implementation, the detected uplink data is the uplink data transmitted by the UE.

In the fifth implementation employed by the UE, the selected repetition number of times is explicitly notified to the base station by the uplink data, by generating uplink data including information indicating the selected repetition number of times and transmitting the uplink data to the base station. Accordingly, the detecting unit 12 may determine the repetition number of times of the uplink data by extracting the information indicating the repetition number of times selected by the UE from the received uplink data.

In particular, the detecting unit 12 may select a repetition number of times from the plurality of repetition number of times, and detect the uplink data by using the selected repetition number of times. If the uplink data is successfully detected, the information is extracted from the uplink data to determine the selected repetition number of times indicated by the information as the repetition number of times of the uplink data.

More particularly, the detecting unit 12 may select a repetition number of times from the plurality of repetition number of times, and, at a time when the number of uplink data received is equal to the selected repetition number of times, blindly decode a combined data obtained by combining the uplink data of the number equal to the selected repetition number of times to attempt detecting the uplink data. If the uplink data is successfully detected, the detecting unit 12 extracts the information from the uplink data to determine the repetition number of times indicated by the information as the repetition number of times of the uplink data. On the other hand, if the uplink data is not detected, the detecting unit 12 may select another repetition number of times from the plurality of repetition number of times, and, at a time when the number of uplink data received is equal to the selected repetition number of times, blindly decode a combined data obtained by combining the uplink data of the number equal to the selected repetition number of times to attempt detecting the uplink data. The detecting unit 12 may repeat the above operations of selecting and decoding attempt until the uplink data is successfully detected, and then the information is extracted from the uplink data to determine the selected repetition number of times indicated by the information as the repetition number of times of the uplink data. Then, at a time when the number of uplink data received is equal to the repetition number of times indicated by the information, the detecting unit 12 may combine the received uplink data for blind decoding, thereby detecting the uplink subframes. Certainly, in some cases, a repetition number of times selected when determining the repetition number of times is the same as the repetition number of times indicated by the information, such that the uplink data detected when determining the repetition number of times is the uplink data transmitted by the UE.

In the sixth implementation employed by the UE, the selected repetition number of times is explicitly notified to the base station by the uplink data, by multiplexing the uplink data with control information including information indicating the selected repetition number of times and transmitting the multiplexed data to the base station. Accordingly, the detecting unit 12 may determine the repetition number of times of the uplink data by detecting the control information multiplexed with the uplink data.

In particular, the detecting unit 12 may select a repetition number of times from the plurality of repetition number of times, and detect the control information multiplexed with the uplink data with the selected repetition number of times. If the control information is successfully detected, the repetition number of times indicated by the control information is determined as the repetition number of times of the uplink data.

More particularly, the detecting unit 12 may select a repetition number of times from the plurality of repetition number of times, and, at a time when the number of uplink data received is equal to the selected repetition number of times, extract the control information multiplexed with the uplink data, combine the extracted control information, and blindly decode the combined control information to attempt detecting the control information. If the control information is successfully detected, the detecting unit 12 may determine the repetition number of times indicated by the control information as the repetition number of times of the uplink data. On the other hand, if the control information is not detected, the detecting unit 12 may select another repetition number of times from the plurality of repetition number of times, and, at a time when the number of uplink data received is equal to the selected repetition number of times, extract the control information multiplexed with the uplink data, combine the extracted control information, and blindly decode the combined control information to attempt detecting the control information. The detecting unit 12 may repeat the above operations of selecting and decoding attempt until the control information is successfully detected, and then determine the repetition number of times indicated by the control information as the repetition number of times of the uplink data. Then, at a time when the number of uplink data received is equal to the repetition number of times indicated by the control information, the detecting unit 12 may combine the received uplink data for blind decoding, thereby detecting the uplink subframes. In this implementation, since the manner in which the UE multiplexes the control information with the uplink data is known to the base station, the detecting unit 12 may extract the control information multiplexed with the uplink data according to the manner.

After the uplink subframes are detected, the detecting unit 12 may determine the time at which the transmission of the repeatedly transmitted uplink data ends as a reference time, and determine an HARQ time according to the reference time and a predetermined offset of the HARQ time relative to the reference time, and transmit feedback information for the uplink data to the UE at the HARQ time, for example, by a transmitting unit (not illustrated)).

In this way, the base station may correctly determine the repetition pattern of the uplink data according to the information included in the uplink data transmitted by the UE and the transmission manner of the uplink data, and thus correctly determine the reference time, so that the HARQ time determined according to the reference time is consistent with the expected HARQ time of the UE, thereby avoiding the problem of reduced frequency spectrum efficiency and increased system power consumption caused by the inconsistency between the expected HARQ time of the UE and the HARQ time determined by the base station.

It should be noted that the terms "include", "comprise" or any other variations thereof in the specification are intended to encompass a non-exclusive inclusion, such that a process, method, article or device comprising a series of elements includes not only those elements, but also other elements that are not explicitly listed, or elements inherent to such a process, method, article or device. In the absence of further restrictions, an element defined by the phrase "comprising a . . . " does not exclude the presence of additional equivalent elements in the process, method, article or device comprising the said element.

Finally, it should be further noted that the series of processes described above include not only processes executed in time sequence in the order described herein, but also processes executed in parallel or separately rather than in time sequence.

Through the description of the above embodiments, those skilled in the art can clearly understand that the present disclosure may be implemented by means of software plus a necessary hardware platform, and certainly may also be implemented all by hardware. Based on such understanding, all or part of technical solutions of the present disclosure contributing to the background art may be embodied in the form of a software product that may be stored in a storage medium, such as a ROM/RAM, a magnetic disk, an optical disk or the like, including several instructions to enable a computer device (such as, a personal computer, a server, or a network device, etc.) to execute the methods described in various embodiments or portions of the embodiments of the present disclosure.

The present disclosure has been described in detail above. Specific examples are used herein to explain the principles and embodiments of the present disclosure, and the description of the above embodiments is intended to help understand the methods of the present disclosure and core ideas thereof; in the meantime, changes shall be made in the specific implementations and application scope for those skilled in the art in light of the ideas of the present disclosure. In conclusion, the contents of this specification should not be construed as limitation of the present disclosure.

The invention claimed is:

1. A method for notifying a repetition pattern of uplink data, performed by a user equipment, comprising:
   selecting one of a plurality of repetition patterns as a repetition pattern of uplink data; and
   implicitly or explicitly notifying a base station of the selected repetition pattern by the uplink data, so that the base station acquires the repetition pattern selected by the user equipment, the explicitly notifying the base station of the selected repetition pattern by the uplink data including:
      explicitly notifying the base station of the selected repetition pattern by the uplink data, by multiplexing the uplink data with control information including information indicating the selected repetition pattern and transmitting the multiplexed data to the base station.

2. The method according to claim 1, the repetition pattern including a repetition number of times of the uplink data.

3. The method according to claim 1, the implicitly notifying the base station of the selected repetition pattern by the uplink data including:
   implicitly notifying the base station of the selected repetition pattern by the uplink data, by transmitting the uplink data to the base station at a frequency or time corresponding to the selected repetition pattern.

4. The method according to claim 1, the implicitly notifying the base station of the selected repetition pattern by the uplink data including:
   implicitly notifying the base station of the selected repetition pattern by the uplink data, by generating the uplink data using a scrambling sequence or scheduling information corresponding to the selected repetition pattern and transmitting the uplink data to the base station.

5. A user equipment, comprising:
   a selecting unit, configured to select one of a plurality of repetition patterns as a repetition pattern of uplink data; and
   a notifying unit, configured to explicitly or implicitly notify a base station of the selected repetition pattern by the uplink data, so that the base station acquires the repetition pattern selected by the user equipment,
   the notifying unit configured to explicitly notify the base station of the selected repetition pattern by the uplink data, by multiplexing the uplink data with control information including information indicating the selected repetition pattern and by transmitting the multiplexed data to the base station.

6. The user equipment according to claim 5, the repetition pattern including a repetition number of times of the uplink data.

7. The user equipment according to claim 5, the notifying unit configured to implicitly notify the base station of the selected repetition pattern by the uplink data, by transmitting the uplink data to the base station at a frequency or time corresponding to the selected repetition pattern.

8. The user equipment according to claim 5, the notifying unit configured to implicitly notify the base station of the selected repetition pattern by the uplink data, by generating the uplink data using a scrambling sequence or scheduling information corresponding to the selected repetition pattern and transmitting the uplink data to the base station.

9. A base station, comprising:
   a receiving unit, configured to receive uplink data; and
   a determining unit, configured to determine a repetition pattern of the uplink data according to information included in the uplink data or a transmission manner of the uplink data,
   the determining unit configured to select the repetition pattern from a plurality of repetition patterns, detect control information multiplexed by using the uplink data with the selected repetition pattern, and if the control information is successfully detected, determine the repetition pattern indicated by the control information as the repetition pattern of the uplink data.

10. The base station according to claim 9, the repetition pattern including a repetition number of times of the uplink data.

11. The base station according to claim 9, the transmission manner of the uplink data including a transmission frequency or a transmission time of the uplink data, and the determining unit configured to determine the repetition pattern corresponding to the transmission frequency or the transmission time of the uplink data as the repetition pattern of the uplink data.

12. The base station according to claim 9, the determining unit configured to select the repetition pattern from a plurality of repetition patterns; detect the uplink data by using the selected repetition pattern and a scrambling sequence or scheduling information corresponding to the selected repetition pattern; and if the uplink data is successfully detected, determine the selected repetition pattern as the repetition pattern of the uplink data.

\* \* \* \* \*